(12) United States Patent
McComb et al.

(10) Patent No.: US 10,954,804 B2
(45) Date of Patent: Mar. 23, 2021

(54) ROTARY MACHINES INCLUDING A HYBRID ROTOR WITH HOLLOW AND SOLID ROTOR BLADE SETS

(71) Applicant: United Technologies Corporation, Farmington, CT (US)

(72) Inventors: Patrick James McComb, Cromwell, CT (US); Sean A. Whitehurst, St. Louis, MO (US)

(73) Assignee: Raytheon Technologies Corporation, Farmington, CT (US)

( * ) Notice: Subject to any disclaimer, the term of this patent is extended or adjusted under 35 U.S.C. 154(b) by 612 days.

(21) Appl. No.: 15/642,138

(22) Filed: Jul. 5, 2017

(65) Prior Publication Data
US 2019/0010812 A1 Jan. 10, 2019

(51) Int. Cl.
| | | |
|---|---|---|
| *F01D 5/30* | (2006.01) |
| *F01D 5/34* | (2006.01) |
| *F01D 5/18* | (2006.01) |
| *F04D 29/32* | (2006.01) |
| *F04D 29/34* | (2006.01) |

(Continued)

(52) U.S. Cl.
CPC ........... *F01D 5/3007* (2013.01); *F01D 5/147* (2013.01); *F01D 5/18* (2013.01); *F01D 5/34* (2013.01); *F04D 29/023* (2013.01); *F04D 29/321* (2013.01); *F04D 29/322* (2013.01); *F04D 29/325* (2013.01); *F04D 29/34* (2013.01); *F04D 29/666* (2013.01); *B64D 27/10* (2013.01); *F05D 2220/323* (2013.01); *F05D 2260/961* (2013.01)

(58) Field of Classification Search
CPC .......... F01D 5/3007; F01D 5/14; F01D 5/147; F01D 5/18; F01D 5/34; F01D 5/027; F01D 5/10; F01D 5/22; F01D 5/26; F01D 25/04; F01D 25/06; F04D 29/321; F04D 29/023; F04D 29/666; F04D 29/34; F04D 29/325; F04D 29/322; F05D 2260/961; F05D 2220/323; B64D 27/10
USPC .................................................. 416/175, 203
See application file for complete search history.

(56) References Cited

U.S. PATENT DOCUMENTS

| | | | | |
|---|---|---|---|---|
| 2,802,619 A | * | 8/1957 | Clarke ...................... | F01D 5/18 416/214 R |
| 2,861,775 A | * | 11/1958 | Whitehead ................ | F01D 5/18 416/220 R |

(Continued)

FOREIGN PATENT DOCUMENTS

| | | |
|---|---|---|
| DE | 892403 | 10/1953 |
| EP | 2957380 | 12/2015 |

(Continued)

OTHER PUBLICATIONS

European Patent Office, European Search Report dated Oct. 19, 2018 in Application No. 18179652.5.

*Primary Examiner* — Hung Q Nguyen
(74) *Attorney, Agent, or Firm* — Snell & Wilmer L.L.P.

(57) ABSTRACT

A hybrid rotor may comprise a rotor disk having a peripheral rim, a plurality of solid rotor blades extending outwardly from the rotor disk, and a plurality of hollow rotor blades extending outwardly from the rotor disk in a blade array with the plurality of solid rotor blades. In various embodiments, the plurality of solid rotor blades may be integrally coupled to the rotor disk. In various embodiments, the plurality of hollow rotor blades may be mechanically retained in the rotor disk.

20 Claims, 7 Drawing Sheets

(51) Int. Cl.
     *F04D 29/66*         (2006.01)
     *F01D 5/14*          (2006.01)
     *F04D 29/02*         (2006.01)
     B64D 27/10        (2006.01)

(56) References Cited

U.S. PATENT DOCUMENTS

| | | | | |
|---|---|---|---|---|
| 4,097,192 | A * | 6/1978 | Kulina | F01D 5/14 |
| | | | | 416/175 |
| 4,135,857 | A * | 1/1979 | Pannone | F01D 5/143 |
| | | | | 416/193 A |
| 6,471,482 | B2 * | 10/2002 | Montgomery | F04D 29/666 |
| | | | | 416/203 |
| 7,147,437 | B2 * | 12/2006 | Burdgick | F01D 5/147 |
| | | | | 416/1 |
| 2002/0064458 | A1 * | 5/2002 | Montgomery | F01D 5/10 |
| | | | | 415/208.3 |
| 2007/0065292 | A1 * | 3/2007 | Schilling | F01D 5/14 |
| | | | | 416/229 A |
| 2011/0005075 | A1 | 1/2011 | Trewiler | |
| 2012/0324901 | A1 | 12/2012 | Allam | |
| 2014/0301850 | A1 * | 10/2014 | Garcia Crespo | F01D 5/282 |
| | | | | 416/193 A |
| 2015/0093249 | A1 * | 4/2015 | Lang | F01D 5/14 |
| | | | | 416/241 B |
| 2015/0360292 | A1 | 12/2015 | Kountanya et al. | |
| 2016/0175983 | A1 * | 6/2016 | Chivers | B22F 5/04 |
| | | | | 29/889.23 |
| 2016/0369638 | A1 | 12/2016 | Whitehurst et al. | |

FOREIGN PATENT DOCUMENTS

| | | |
|---|---|---|
| EP | 3115555 | 1/2017 |
| WO | 2014052320 | 4/2014 |

\* cited by examiner

ROTARY MACHINES INCLUDING A HYBRID ROTOR WITH HOLLOW AND SOLID ROTOR BLADE SETS

FIELD

The present disclosure relates generally to gas turbine engines. More particularly, the present disclosure relates to rotary machines including a hybrid rotor with an integrally bladed rotor portion.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of blades. The rotor may be an integrally bladed rotor ("IBR") or a mechanically bladed rotor.

The rotor disk and blades in the IBR are one piece (i.e., integral) with the blades spaced around the circumference of the rotor disk. Conventional IBRs may be formed using a variety of technical methods including integral casting, machining from a solid billet, or by welding or bonding the blades to the rotor disk. Conventional IBRs may include mistuned blades that respond differently at an engine stability pinch point. The "engine stability pinch point" is the engine operating point at which the remaining stability margin (available stability margin less the stability margin consumed by the sum of the external and internal destabilizing factors) is a relative medium. By making the blades have different responses because of their mistuning, the magnitude of a non-integral vibratory response (e.g., flutter) may be lessened. However, mistuned blades may reduce aerodynamic efficiency of the IBR. In addition, machining of an IBR may be difficult because of limited space between blades. For example, as engine cores (e.g., compressors and turbines) get smaller, the space between blades of an IBR shrinks, and the tooling does not shrink, so it is harder to machine the blades of IBRs as a machining head cannot fit between the blades.

Mechanically bladed rotors also have disadvantages. For example, the blades in a mechanically bladed fan rotor of a gas turbine engine may suffer from greater fan blade pull load because there is less rotor disk material to carry the pull load. Greater fan blade pull load increases stress levels on the rotor disk and thus on the rotor and potentially limits rotor life.

SUMMARY

A hybrid rotor is disclosed herein, in accordance with various embodiments. The hybrid rotor may comprise a rotor disk having a peripheral rim, a plurality of solid rotor blades extending outwardly from the rotor disk, and a plurality of hollow rotor blades extending outwardly from the rotor disk in a blade array with the plurality of solid rotor blades.

In various embodiments, the plurality of solid rotor blades may be spaced around a circumference of the rotor disk in circumferentially spaced apart sets, each set comprising one or more solid rotor blades and the plurality of hollow rotor blades are spaced around the circumference of the rotor disk in circumferentially spaced apart sets of one or more hollow rotor blades, wherein each set of the one or more hollow rotor blades is disposed circumferentially adjacent and between a pair of adjacent circumferentially spaced apart sets of solid rotor blades. The peripheral rim may include a mechanical retention slot disposed between and adjacent the pair of adjacent circumferentially spaced apart sets of solid rotor blades, the number of mechanical retention slots corresponding to the number of hollow rotor blades in the blade array and each mechanical retention slot configured to retain an individual rotor blade of the hybrid rotor. Each set of the one or more solid rotor blades may comprise the same or a different number of solid rotor blades and each set of the one or more hollow rotor blades may comprise the same or a different number of hollow rotor blades. The plurality of hollow rotor blades and the plurality of solid rotor blades respectively may comprise the same or different materials. The plurality of hollow rotor blades and the plurality of solid rotor blades may be respectively independently tuned for effecting a different response at an engine stability pinch point. Each individual rotor blade may comprise an airfoil having a leading edge and a trailing edge extending from a root portion to a tip portion defining therebetween first and second opposite sides, and a flange integrally joined to the root portion and received in the mechanical retention slot, wherein each mechanical retention slot includes opposing overhung portions cooperating with the flange to retain the individual rotor blade in the blade array.

A hybrid rotor is disclosed herein, in accordance with various embodiments. The hybrid rotor may comprise an individual rotor blade, and an integrally bladed rotor portion comprising a rotor disk portion having a peripheral rim configured to mechanically retain the individual rotor blade, and a blade portion comprising an integral rotor blade extending outwardly and integrally from the rotor disk portion, the individual rotor blade configured to extend radially outwardly from the rotor disk portion in a blade array with the integral rotor blade, wherein the individual rotor blade is hollow and the integral rotor blade is solid.

In various embodiments, the integral rotor blade may comprise a plurality of integral rotor blades spaced around a circumference of the rotor disk portion in circumferentially spaced apart sets, each set comprising one or more integral rotor blades. The individual rotor blade may comprise a plurality of individual rotor blades spaced around the circumference of the rotor disk portion in circumferentially spaced apart sets, each set comprising at least one individual rotor blade. Each set of the one or more individual rotor blades may be disposed circumferentially adjacent and between a pair of adjacent circumferentially spaced apart sets of the integral rotor blades. The peripheral rim may include a mechanical retention slot disposed between and adjacent the pair of adjacent circumferentially spaced apart sets of the integral rotor blades, the number of mechanical retention slots corresponding to the number of individual rotor blades in the blade array. Each set of the at least one or more integral rotor blades may comprise the same or a different number of integral rotor blades and each set of the one or more individual rotor blades may comprise a different number of individual rotor blades. The plurality of individual rotor blades and the plurality of integral rotor blades respectively may comprise the same or different materials. The plurality of individual rotor blades and the plurality of integral rotor blades may be respectively independently tuned. The individual rotor blade may comprise an airfoil having a leading edge and a trailing edge extending from a root portion to a tip portion defining therebetween first and second opposite sides, and a flange integrally joined to the root portion and received in the mechanical retention slot.

Each mechanical retention slot may include opposing overhung portions cooperating with the flange to retain the individual rotor blade in the integrally bladed rotor portion.

A rotary machine is disclosed herein, in accordance with various embodiments. The rotary machine may comprise a rotor disk having a peripheral rim, a plurality of solid rotor blades extending outwardly from the rotor disk, and a plurality of hollow rotor blades extending outwardly from the rotor disk in a blade array with the plurality of solid rotor blades.

In various embodiments, the rotor disk and the plurality of solid rotor blades may be formed into a single piece and the rotary machine comprises a gas turbine engine. Each hollow rotor blade may comprise an airfoil having a leading edge and a trailing edge extending from a root portion to a tip portion defining therebetween first and second opposite sides, and a flange integrally joined to the root portion and received in a mechanical retention slot, wherein the rotary machine comprises a gas turbine engine.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Figure 1:
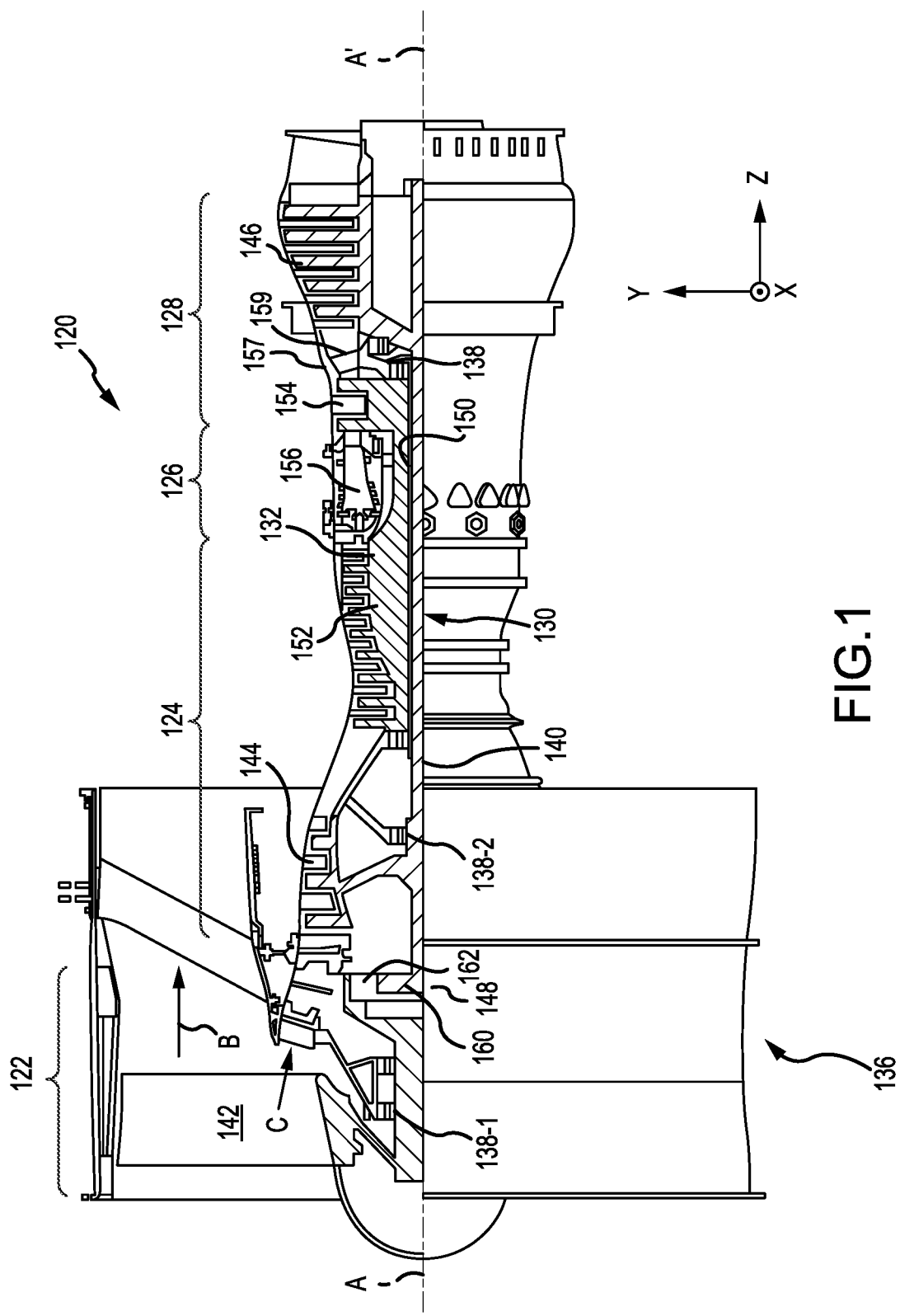
FIG. 1 illustrates a cross-sectional view of a gas turbine engine in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion. As used herein, "distal" refers to the direction radially outward, or generally, away from the axis of rotation of a turbine engine. As used herein, "proximal" refers to a direction radially inward, or generally, toward the axis of rotation of a turbine engine.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Various embodiments are directed to rotary machines including a hybrid rotor with an integrally bladed rotor portion. As used herein, the terms "integral", "integrally" or the like means one-piece. In various embodiments, the rotary machine may be a gas turbine engine. The hybrid rotor may include both integral rotor blades (a "first rotor blade configuration") and mechanically retained rotor blades (a "second rotor blade configuration"). Each of first and second rotor blade configurations may be independently tuned to exhibit different responses at the engine stability pinch point without sacrificing efficiency. The hybrid rotor may include both solid rotor blades (a "first rotor blade type") and hollow rotor blades (a "second rotor blade type"). Each of the first and second rotor blade types may be independently tuned to exhibit different aeromechanical responses at the engine stability pinch point without sacrificing efficiency. There may also be other flight conditions where such mistuning may be beneficial. For example, integral responses may also benefit if the blades do not respond together. The hybrid rotor also provides easier repair and machinability, lowers rotor stress, and permits using different materials for the integral rotor blades relative to the mechanically retained rotor blades. Using different materials for the two different blade configurations may be useful for high and low cycle fatigue issues, mistuning, and in response to a rotor blade that is impacted or released. For example, a lighter material for one rotor blade configuration may be used to reduce its impact on rotor blades of the other rotor blade configuration should it be released. Furthermore, using different rotor blade types for one or both of the different blade configurations may be useful for high and low cycle fatigue issues and/or mistuning. For example, disposing rotor blades of alternating blade types around a rotor disk may result in varying aeromechanical responses because of their mistuning.

With reference to FIG. 1, a gas turbine engine 120 is provided. An X-Y-Z axis illustrated in FIG. 1 illustrates the axial (Z), radial (Y) and circumferential (X) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the positive R direction.

Gas turbine engine 120 can be a two-spool turbofan that generally incorporates a fan section 122, a compressor section 124, a combustor section 126 and a turbine section 128. Alternative engines include an augmentor section among other systems or features. In operation, fan section 122 drives coolant along a bypass flow-path B while compressor section 124 drives coolant along a core flow-path C for compression and communication into combustor section 126 then expansion through turbine section 128. Although depicted as a turbofan gas turbine engine 120 herein, it should be understood that the concepts described herein are not limited to use with turbofans as the teachings can be applied to other types of turbine engines including three-spool architectures.

Gas turbine engine 120 generally comprises a low speed spool 130 and a high speed spool 132 mounted for rotation about an engine central longitudinal axis A-A' relative to an engine static structure 136 via several bearing systems 138, 138-1, and 138-2. It should be understood that various bearing systems 138 at various locations can alternatively or additionally be provided, including for example, bearing system 138, bearing system 138-1, and bearing system 138-2.

Low speed spool 130 generally includes an inner shaft 140 that interconnects a fan 142, a low pressure (or first) compressor section 144 and a low pressure (or first) turbine section 146. Inner shaft 140 is connected to fan 142 through a geared architecture 148 that can drive fan 142 at a lower speed than low speed spool 130. Geared architecture 148 includes a gear assembly 160 enclosed within a gear housing 162. Gear assembly 160 couples inner shaft 140 to a rotating fan structure. High speed spool 132 includes an outer shaft 150 that interconnects a high pressure (or second) compressor section 152 and high pressure (or second) turbine section 154. A combustor 156 is located between high pressure compressor 152 and high pressure turbine 154. A mid-turbine frame 157 of engine static structure 136 is located generally between high pressure turbine 154 and low pressure turbine 146. Mid-turbine frame 157 supports one or more bearing systems 138 in turbine section 128. Inner shaft 140 and outer shaft 150 are concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 144 then high pressure compressor 152, mixed and burned with fuel in combustor 156, then expanded over high pressure turbine 154 and low pressure turbine 146. Mid-turbine frame 157 includes airfoils 159 which are in the core airflow path. Turbines 146, 154 rotationally drive the respective low speed spool 130 and high speed spool 132 in response to the expansion.

Gas turbine engine 120 is a high-bypass geared aircraft engine. The bypass ratio of gas turbine engine 120 can be greater than about six (6). The bypass ratio of gas turbine engine 120 can also be greater than ten (10). Geared architecture 148 can be an epicyclic gear train, such as a star gear system (sun gear in meshing engagement with a plurality of star gears supported by a carrier and in meshing engagement with a ring gear) or other gear system. Geared architecture 148 can have a gear reduction ratio of greater than about 2.3 and low pressure turbine 146 can have a pressure ratio that is greater than about five (5). The bypass ratio of gas turbine engine 120 can be greater than about ten (10:1). The diameter of fan 142 can be significantly larger than that of the low pressure compressor section 144, and the low pressure turbine 146 can have a pressure ratio that is greater than about five (5:1). Low pressure turbine 146 pressure ratio is measured prior to inlet of low pressure turbine 146 as related to the pressure at the outlet of low pressure turbine 146 prior to an exhaust nozzle. It should be understood, however, that the above parameters are exemplary of particular embodiments of a suitable geared architecture engine and that the present disclosure contemplates other turbine engines including direct drive turbofans.

Figure 2:
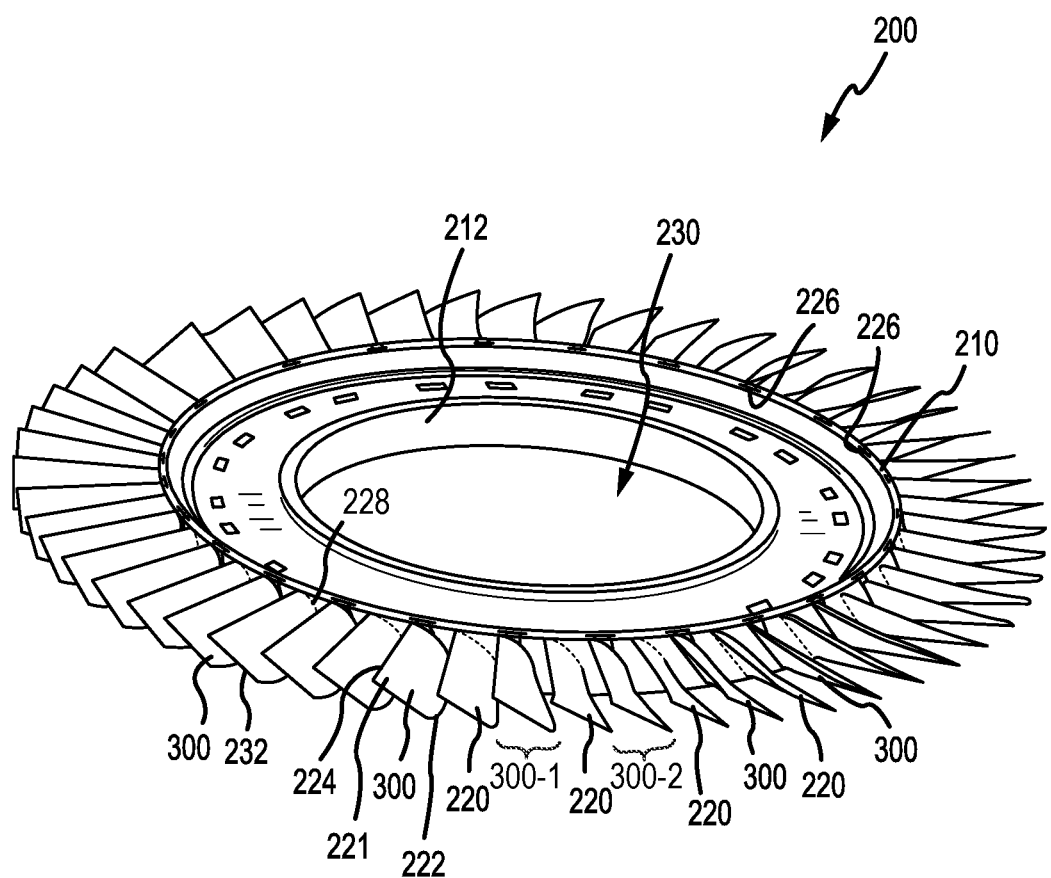
FIG. 2 illustrates a perspective view of a hybrid rotor in accordance with various embodiments.
Figure 4:
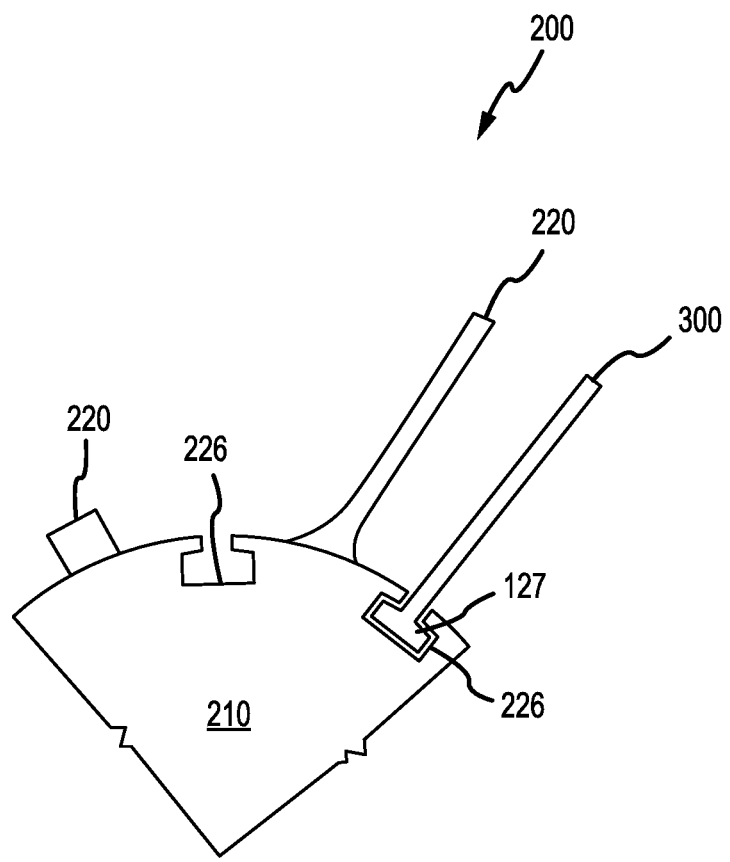
FIG. 4 illustrates a front schematic view of a portion of the hybrid rotor of FIG. 2 including the integrally bladed rotor portion of FIG. 3 in accordance with various embodiments.

Referring now to FIG. 2 illustrating a hybrid rotor 200 according to various embodiments. FIG. 4 is a front view of a portion of the hybrid rotor of FIG. 2. In various embodiments, hybrid rotor 200 may be a rotor in compressor section 124 of gas turbine engine 120 in FIG. 1. In another aspect hybrid rotor 200 may be a rotor in the fan section 122 of the gas turbine engine 120 shown in FIG. 1. In other aspects, hybrid rotor 200 may be located in the turbine section 128 of the gas turbine engine 120. Such description may also be applicable to impellers as well as additional or other stages. It should also be understood that other rotor modules will also benefit from the various embodiments herein described.

Figure 3:
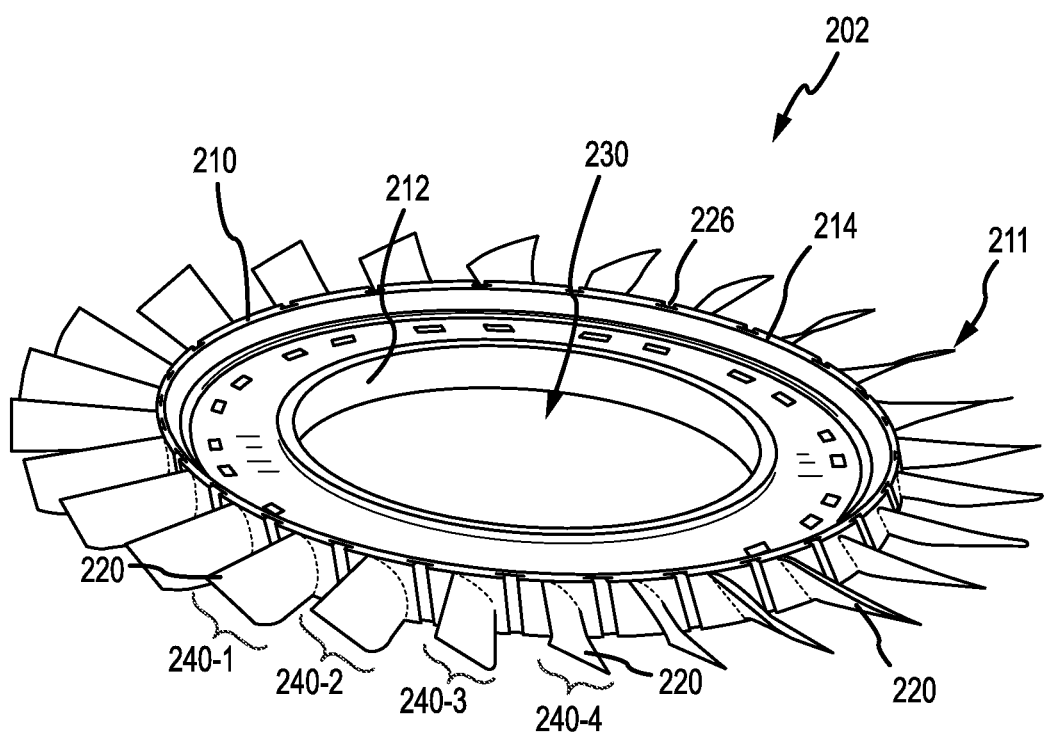
FIG. 3 illustrates a perspective view of an integrally bladed rotor portion of the hybrid rotor of FIG. 2, in accordance with various embodiments.

Still referring to FIGS. 2 and 3, according to various embodiments, hybrid rotor 200 comprises an integrally bladed rotor portion 202 (FIG. 3) and a plurality of individual rotor blades 300. The individual rotor blades 300 are mechanically retained in the hybrid rotor 200. The integrally bladed rotor portion 202 (FIG. 2) comprises a rotor disk portion 210 and a blade portion 211 as one piece. Rotor disk portion 210 includes a rim 214 around the periphery of the rotor disk portion (a "peripheral rim") and a bore 230 defined by an inner circumference 212 of rotor disk portion 210. The blade portion 211 comprises a plurality of integral rotor blades 220 (indicated by dotted lines at the base of the rotor blades in FIGS. 2 and 3) circumferentially spaced around the rotor disk portion and extending outwardly and integrally from the rotor disk portion 210. An integral rotor blade 220 comprises an airfoil 221 with a leading edge 222 and trailing edge 224 extending between a root portion 228 and a tip portion 232 defining therebetween first and second opposite sides. The plurality of integral rotor blades 220 is arranged in circumferentially spaced apart sets. Each set comprises one or more integral rotor blades. Each set of the one or more integral rotor blades comprises the same or a different number of integral rotor blades 220. While FIGS. 2 and 3 illustrate the plurality of integral rotor blades 220 depicted there to be arranged in circumferentially spaced sets (e.g., 240-1, 240-2, 240-3, 240-4) of one integral rotor blade each, it is to be understood that one or more of the circumferentially spaced sets of integral rotor blades may have a greater number of integral rotor blades therein.

In various embodiments, the integrally bladed rotor portion 202 (FIG. 3) may be formed using a variety of technical methods including integral casting, machining from a solid billet or by welding, such as friction welding for example, or bonding the integral rotor blades 220 of the blade portion 211 to the rotor disk portion 210. The integrally bladed rotor portion 202 includes a mechanical retention slot 226 in the peripheral rim of the rotor disk portion as hereinafter described.

The plurality of individual rotor blades 300 extend outwardly from the rotor disk portion 210 in a blade array with the plurality of integral rotor blades 220. The plurality of individual rotor blades 300 are circumferentially spaced around the circumference of the rotor disk portion 210 and arranged in circumferentially spaced apart sets (e.g., 300-1, 300-2) of one or more individual rotor blades 300. Each set of the one or more individual rotor blades is disposed circumferentially adjacent and between a pair of circumferentially adjacent spaced apart sets (e.g., 240-1, 240-2, 240-3, 240-4) of the integral rotor blades 220. Each set of the one or more individual rotor blades comprises the same or a different number of individual rotor blades.

Still referring to FIGS. 2 through 3 and returning to FIG. 4, the peripheral rim 214 includes the mechanical retention slot 226 disposed between and adjacent each pair of circumferentially adjacent spaced apart sets of the integral rotor blades 220. The number of mechanical retention slots 226 corresponds to the number of individual rotor blades 300 in the blade array. Each mechanical retention slot 226 is configured to retain a corresponding individual rotor blade 300 in the hybrid rotor 200. The individual rotor blades 300 may be axially restrained by a snap ring or the like.

The mechanical retention slots 226 are disposed adjacent and between the root portion 228 of circumferentially adjacent sets of integral rotor blades. As noted previously, the set may comprise one or more integral blades. Each mechanical retention slot 226 is configured to receive and mechanically retain one of the individual rotor blades 300 (more particularly, an integral flange 127 of the individual rotor blade 300 as hereinafter described). Thus, the blade array comprises alternating integral rotor blades 220 and individual rotor blades 300. The individual rotor blades are mechanically retained in the mechanical retention slots 226 in the IBR portion (more particularly, in the peripheral rim 214 of the rotor disk portion 210). Like the integral rotor blade 220, each individual rotor blade 300 comprises an airfoil having a leading edge and a trailing edge extending from a root portion to a tip portion defining therebetween first and second opposite sides. The integral flange 127 is integrally joined to the root portion of the individual rotor blade and may be referred to as a "dovetail".

Figure 5:
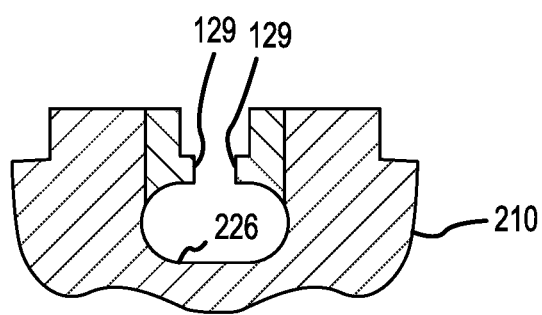
FIG. 5 illustrates a mechanical retention slot of the hybrid rotor of FIG. 2 including opposing overhung portions, in accordance with various embodiments.

Still referring to FIG. 2, the individual rotor blade 300 is schematically illustrated and may include the second blade configuration that permits mechanical retention of the individual blade in the mechanical retention slot in the peripheral rim of the integrally bladed rotor portion. For example, the individual rotor blades 300 illustrated in FIG. 2 each include the integral flange 127 that is configured to be received and retained in the mechanical retention slot as illustrated in FIG. 4. While an integral flange for attaching the individual blade to the IBR portion has been described and illustrated, it is to be understood that other attachment configurations may be used in fabricating the hybrid rotor according to various embodiments. The shape and size of the integral flange 127 complements with the shape and size of the mechanical retention slot 226 so that the individual rotor blade may be retained in the hybrid rotor. Due to space constraints between adjacent blades (between adjacent sets of integral blades) and the curvature of the blades (of the first and/or second configuration), the integral flange/dovetail may be configured so as to permit insertion into the mechanical retention slot without substantial interference from adjacent blades. While FIG. 4 illustrates a simple inverted generally rectangular integral flange, it is to be understood that the shape of the flange and the mechanical retention slot may vary as long as they have complementary shapes and sizes. Referring now to FIG. 5, the mechanical retention slot 226 may include opposing overhung portions 129 and/or angled bearing surfaces that substantially prevent outward radial movement of the flange from the mechanical retention slot. The mechanical retention slots 226 may be axially-oriented or otherwise. As noted previously, the individual rotor blades 300 may also be axially restrained by a snap ring or the like.

FIG. 3 depicts one of two mechanical retention slots (only two are shown) adjacent and between two integral rotor blades (the set in the depicted embodiment) (one of the two integral rotor blades is only partially illustrated). While a single individual blade is depicted adjacent and between a set of two integral rotor blades, it is to be understood that one or more individual blades may be disposed adjacent and between a pair of circumferentially adjacent sets including one or more integral rotor blades. The sets may have the same or a different number of integral rotor blades.

Figure 6:
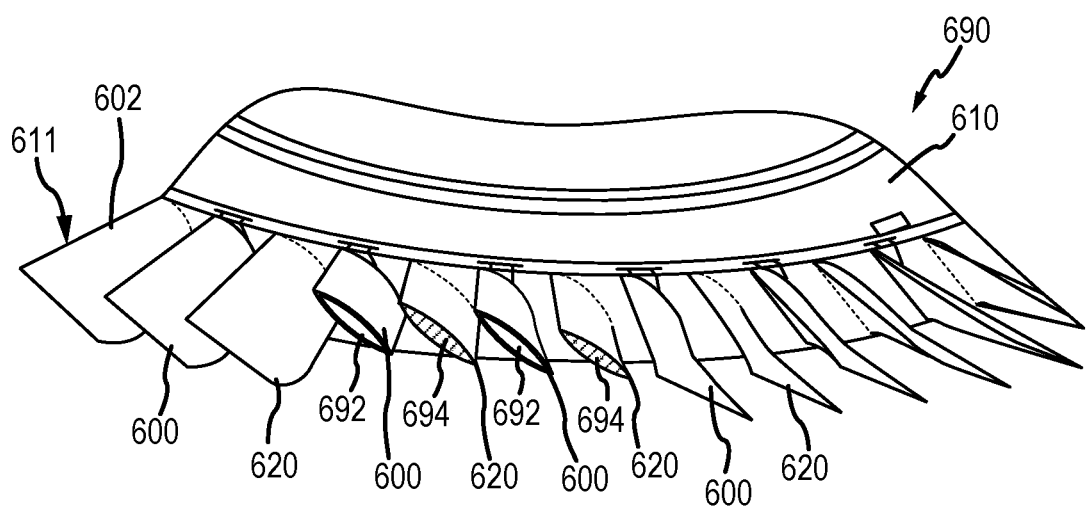
FIG. 6 illustrates a partial cross-sectional view of a rotor blade array having solid rotor blades and hollow rotor blades, wherein the hollow rotor blades are mechanically retained and the solid rotor blades are integrally coupled, in accordance with various embodiments.

The foregoing provides a description of a hybrid rotor, in accordance with various embodiments, having an integral rotor blade configuration and a mechanically retained rotor blade configuration. In various embodiments, and as hereinafter described, a hybrid rotor may comprise a blade array comprising one or more solid rotor blades and one or more hollow rotor blades. With reference to FIG. 6 a hybrid rotor 690 is illustrated, in accordance with various embodiments. With momentary reference to FIG. 2, hybrid rotor 200 may be similar to hybrid rotor 690. Hybrid rotor 690 comprises an integrally bladed rotor portion 602 and a plurality of individual rotor blades 600. The individual rotor blades 600 are mechanically retained in the hybrid rotor 690. The integrally bladed rotor portion 602 comprises a rotor disk portion 610 and a blade portion 611 as one piece. The blade portion 611 comprises a plurality of integral rotor blades 620 (indicated by dotted lines in FIG. 6) circumferentially spaced around the rotor disk portion 610 and extending outwardly and integrally from the rotor disk portion 610.

FIG. 6 depicts a cross-section view of four of the rotor blades of hybrid rotor 690. As depicted, individual rotor blades 600 may be hollow rotor blades 692 and integral rotor blades 620 may be solid rotor blades 694. With combined reference to FIG. 2 and FIG. 6, integral rotor blades 220 may be similar to solid rotor blades 694 and individual rotor blades 300 may be similar to hollow rotor blades 692. In this regard, a set of one or more hollow rotor blades 692 may be disposed adjacent and between two sets of one or more solid rotor blades 694.

Figure 7:
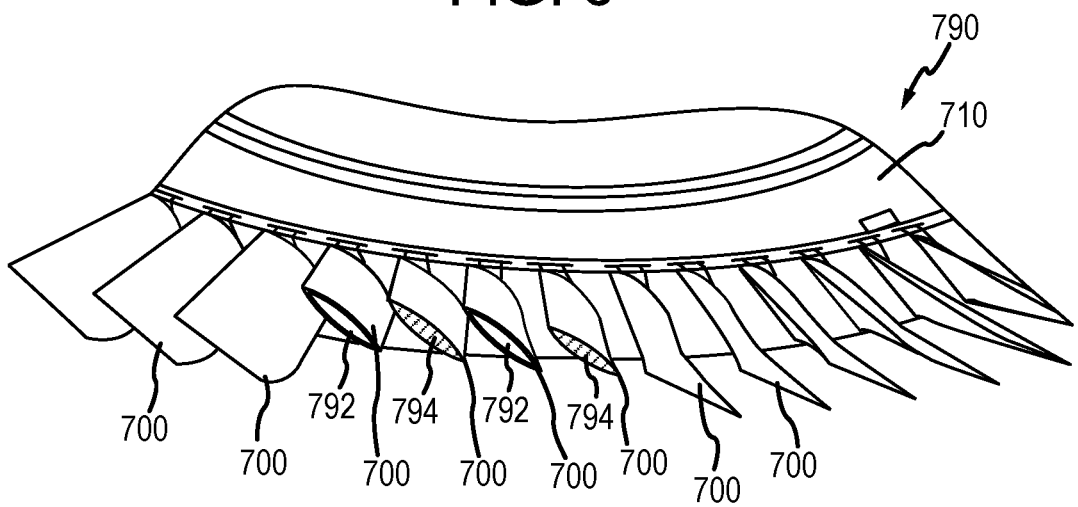
FIG. 7 illustrates a partial cross-sectional view of a rotor blade array having solid rotor blades and hollow rotor blades, wherein the hollow rotor blades are mechanically retained and the solid rotor blades are mechanically retained, in accordance with various embodiments.

FIG. 6 illustrates integral solid rotor blades and mechanically retained hollow rotor blades. With reference to FIG. 7, it is contemplated herein that both the solid rotor blades and the hollow rotor blades may comprise mechanically retained rotor blades. In this regard, hybrid rotor 790 is illustrated, in accordance with various embodiments. With momentary reference to FIG. 2, hybrid rotor 790 may be similar to hybrid rotor 200. Hybrid rotor 790 comprises a rotor disk portion 710 and a plurality of individual rotor blades 700. The individual rotor blades 700 are mechanically retained in the hybrid rotor 790. FIG. 7 depicts a cross-section view of four of the rotor blades of hybrid rotor 790. As depicted, individual rotor blades 700 may comprise both hollow rotor blades 792 and solid rotor blades 794. With combined reference to FIG. 2 and FIG. 7, hollow rotor blades 792 may be similar to individual rotor blades 300 and solid rotor blades 794 may be similar to individual rotor blades 300. In this regard, a set of one or more hollow rotor blades 792 may be disposed adjacent and between two sets of one or more solid rotor blades 794.

Figure 8:
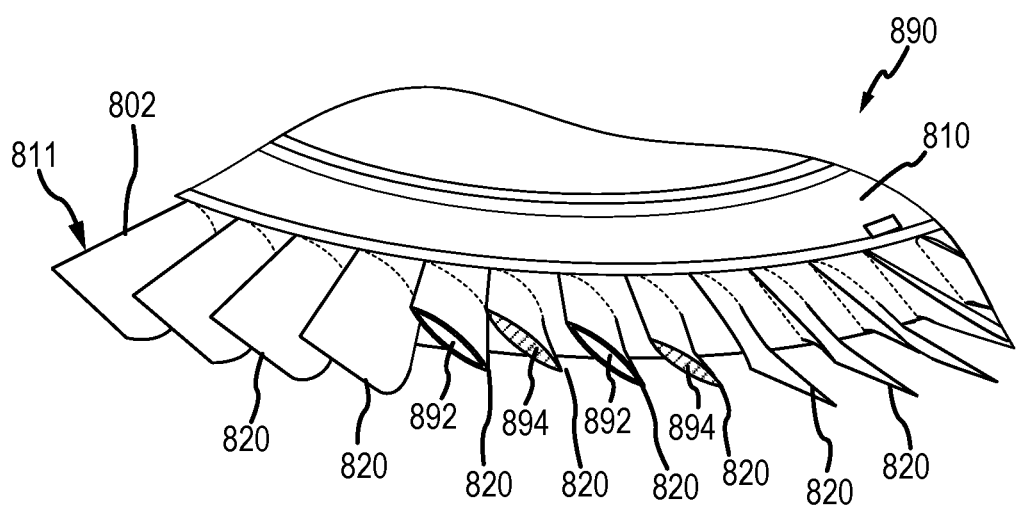
FIG. 8 illustrates a partial cross-sectional view of a rotor blade array having solid rotor blades and hollow rotor blades, wherein the hollow rotor blades are integrally coupled and the solid rotor blades are integrally coupled, in accordance with various embodiments.

FIG. 6 illustrates integral solid rotor blades and mechanically retained hollow rotor blades and FIG. 7 illustrates mechanically retained hollow rotor blades and mechanically retained solid rotor blades. With reference to FIG. 8, it is contemplated herein that both the solid rotor blades and the hollow rotor blades may comprise integral rotor blades. In this regard, hybrid rotor 890 is illustrated, in accordance with various embodiments. Hybrid rotor 890 an integrally bladed rotor portion 802. The integrally bladed rotor portion 802 comprises a rotor disk portion 810 and a blade portion 811 as one piece. The blade portion 811 comprises a plurality of integral rotor blades 820 circumferentially spaced around the rotor disk portion 810 and extending outwardly and integrally from the rotor disk portion 810.

FIG. 8 depicts a cross-section view of four of the rotor blades of hybrid rotor 890. As depicted, integral rotor blades 820 may comprise both hollow rotor blades 892 and solid rotor blades 894. With combined reference to FIG. 2 and FIG. 8, hollow rotor blades 892 may be similar to integral rotor blades 220 and solid rotor blades 894 may be similar to integral rotor blades 220. In this regard, a set of one or more hollow rotor blades 892 may be disposed adjacent and between two sets of one or more solid rotor blades 894.

Figure 9:
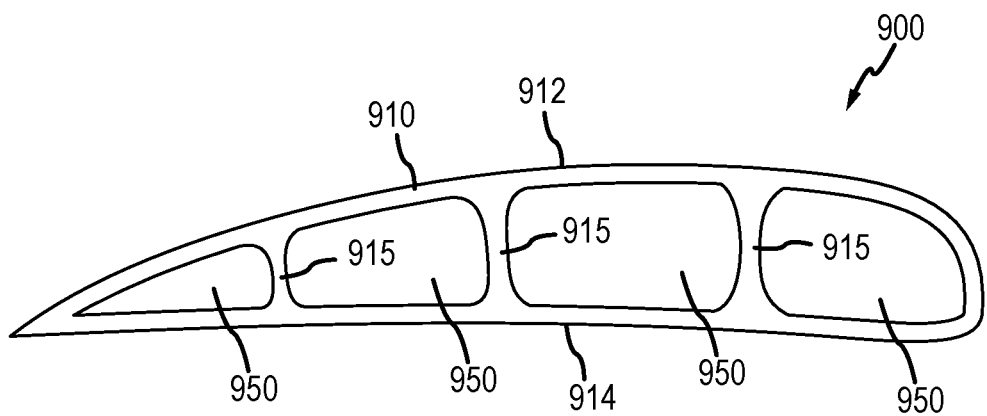
FIG. 9 illustrates a cross-sectional view of a hollow rotor blade, in accordance with various embodiments.

With reference to FIG. 9, a hollow rotor blade 900 is illustrated, in accordance with various embodiments. Hollow rotor blade 900 comprises an outer wall 910. Outer wall 910 may be formed as an airfoil. Outer wall 910 may comprise a first side 912 and a second side 914. First side 912 and second side 914 may be opposite sides of hollow rotor blade 900. A plurality of ribs 915 may extend between the first side 912 of outer wall 910 and the second side 914 of outer wall 910. Ribs 915 may increase the stiffness of hollow rotor blade 900. In this regard, one or more hollow channels 950 may be formed by hollow rotor blade 900. In various embodiments, with momentary reference to FIG. 6 through FIG. 9, hollow rotor blades 692, hollow rotor blades 792, and/or hollow rotor blades 892 may be similar to hollow rotor blade 900.

A hybrid combination of materials may be utilized within the hybrid rotor according to various embodiments. For example, the integral blades may be manufactured of a first material and the mechanical blades may be manufactured of a second material. The first and second materials may be the same or different in various embodiments. It should be understood that various materials and combinations thereof may be utilized. For example, the integrally bladed rotor portion may be fabricated from titanium and the individual blades from a composite material. When the integral blades and the individual blades have the same aerodynamic shape, but are fabricated from different materials, the mechanics are different because the materials are different, thereby resulting in a mistuning of the hybrid rotor. A mistuned hybrid rotor is less sensitive to non-integral vibration (e.g., flutter) as well as to integral vibration. The phrase "different materials," as used in this specification, refers to materials having different properties but which may or may not have the same elemental composition. Thus, alloys having the same composition but which are processed differently (e.g., in a different crystalline form), so as to exhibit differing properties are considered to be "different materials." A hybrid combination of blade characteristics may be utilized within the hybrid rotor according to various embodiments. The integral blades may be mistuned relative to the individual blades so that the integral blades aero-mechanically respond differently at the engine stability pinch point. Similarly, the thickness (as measured from opposite sides of the airfoil) may differ between the integral blades and the individual blades to intentionally mistune the blades in the blade array to substantially alleviate the non-integral vibratory response.

Based on the foregoing, it is to be appreciated that because the hybrid rotor according to various embodiments includes two different blade types, namely hollow blades and solid blades, the hybrid rotor provides several advantages over conventional hollow bladed rotors and conventional solid bladed rotors. For example, the hybrid rotor according to various embodiments permits the hollow blades to be tuned independently from the solid blades. Furthermore, in accordance with various embodiments, by forming an integrally bladed rotor portion and separate individual rotor blades, ease of construction of a hybrid (hollow blade/solid blade) rotor disk may be realized by forming solid rotor blades in the integrally bladed rotor portion and hollow individual rotor blades which can be coupled to the integrally bladed rotor portion after the integrally bladed rotor portion is formed. Furthermore, hollow rotor blades may provide weight savings along with the mistuning benefits.

Furthermore, based on the foregoing, it is to be appreciated that because the hybrid rotor according to various embodiments includes two different blade configurations, namely integral blades and individual blades, the hybrid rotor provides several advantages over conventional mechanically bladed rotors and conventional integrally bladed rotors. For example, the hybrid rotor according to various embodiments permits the individual blades to be tuned independently from the integral blades. The two different blade configurations in the hybrid rotor according to various embodiments may also improve reparability of the integral blades and reduce rotor stress. By removing (temporarily) an adjacent individual blade for repair of the hybrid rotor, removal and re-welding of the integral blade may be simplified. Rotor stress may be reduced as the solid rotor disk material below the integral blades compensates for the stresses in the mechanical retention slots. The part count of the hybrid rotor may be reduced relative to the conventional mechanically bladed rotor. For example, the platforms between blades may be removed and integrated into the hybrid rotor. The part count and machining time may be reduced relative to the conventional IBR. For example, less post-welding would be required (because of fewer welded blades) and the number of seals may be reduced with less leakage. Machining of the hybrid rotor relative to the conventional IBR may be simplified as there is more space around the rim of the rotor disk in the hybrid rotor, making machining faster and easier.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid rotor comprising:
   a rotor disk having a peripheral rim;
   a plurality of solid rotor blades extending outwardly from the rotor disk; and
   a plurality of hollow rotor blades extending outwardly from the rotor disk in a blade array with the plurality of solid rotor blades.

2. The hybrid rotor of claim 1, wherein the plurality of solid rotor blades are spaced around a circumference of the rotor disk in circumferentially spaced apart sets, each set comprising one or more solid rotor blades and the plurality of hollow rotor blades are spaced around the circumference of the rotor disk in circumferentially spaced apart sets of one or more hollow rotor blades, wherein each set of the one or more hollow rotor blades is disposed circumferentially adjacent and between a pair of adjacent circumferentially spaced apart sets of solid rotor blades.

3. The hybrid rotor of claim 2, wherein the peripheral rim includes a mechanical retention slot disposed between and adjacent the pair of adjacent circumferentially spaced apart sets of solid rotor blades, the number of mechanical retention slots corresponding to the number of hollow rotor blades in the blade array and each mechanical retention slot configured to retain an individual rotor blade of the hybrid rotor.

4. The hybrid rotor of claim 3, wherein each set of the one or more solid rotor blades comprises the same or a different number of solid rotor blades and each set of the one or more hollow rotor blades comprises the same or a different number of hollow rotor blades.

5. The hybrid rotor of claim 1, wherein the plurality of hollow rotor blades and the plurality of solid rotor blades respectively comprise the same or different materials.

6. The hybrid rotor of claim 1, wherein the plurality of hollow rotor blades and the plurality of solid rotor blades are respectively independently tuned for effecting a different response at an engine stability pinch point.

7. The hybrid rotor of claim 3, wherein each individual rotor blade comprises:
   an airfoil having a leading edge and a trailing edge extending from a root portion to a tip portion defining therebetween first and second opposite sides; and
   a flange integrally joined to the root portion and received in the mechanical retention slot, wherein each mechanical retention slot includes opposing overhung portions cooperating with the flange to retain the individual rotor blade in the blade array.

8. A hybrid rotor, comprising:
   an individual rotor blade; and
   an integrally bladed rotor portion, comprising:
      a rotor disk portion having a peripheral rim configured to mechanically retain the individual rotor blade; and
      a blade portion comprising an integral rotor blade extending outwardly and integrally from the rotor disk portion, the individual rotor blade configured to extend radially outwardly from the rotor disk portion in a blade array with the integral rotor blade,
   wherein the individual rotor blade is hollow and the integral rotor blade is solid.

9. The hybrid rotor of claim 8, wherein the integral rotor blade comprises a plurality of integral rotor blades spaced around a circumference of the rotor disk portion in circumferentially spaced apart sets, each set comprising one or more integral rotor blades.

10. The hybrid rotor of claim 9, wherein the individual rotor blade comprises a plurality of individual rotor blades spaced around the circumference of the rotor disk portion in circumferentially spaced apart sets, each set comprising at least one individual rotor blade.

11. The hybrid rotor of claim 10, wherein each set of the one or more individual rotor blades is disposed circumferentially adjacent and between a pair of adjacent circumferentially spaced apart sets of the integral rotor blades.

12. The hybrid rotor of claim 11, wherein the peripheral rim includes a mechanical retention slot disposed between and adjacent the pair of adjacent circumferentially spaced apart sets of the integral rotor blades, the number of mechanical retention slots corresponding to the number of individual rotor blades in the blade array.

13. The hybrid rotor of claim 11, wherein each set of the at least one or more integral rotor blades comprises the same or a different number of integral rotor blades and each set of the one or more individual rotor blades comprises a different number of individual rotor blades.

14. The hybrid rotor of claim 11, wherein the plurality of individual rotor blades and the plurality of integral rotor blades respectively comprise the same or different materials.

15. The hybrid rotor of claim 11, wherein the plurality of individual rotor blades and the plurality of integral rotor blades are respectively independently tuned.

16. The hybrid rotor of claim 12, wherein the individual rotor blade comprises:
an airfoil having a leading edge and a trailing edge extending from a root portion to a tip portion defining therebetween first and second opposite sides; and
a flange integrally joined to the root portion and received in the mechanical retention slot.

17. The hybrid rotor of claim 16, wherein each mechanical retention slot includes opposing overhung portions cooperating with the flange to retain the individual rotor blade in the integrally bladed rotor portion.

18. A rotary machine comprising:
a rotor disk having a peripheral rim;
a plurality of solid rotor blades extending outwardly from the rotor disk; and
a plurality of hollow rotor blades extending outwardly from the rotor disk in a blade array with the plurality of solid rotor blades.

19. The rotary machine of claim 18, wherein the rotor disk and the plurality of solid rotor blades are formed into a single piece and the rotary machine comprises a gas turbine engine.

20. The rotary machine of claim 18, wherein each hollow rotor blade comprises:
an airfoil having a leading edge and a trailing edge extending from a root portion to a tip portion defining therebetween first and second opposite sides; and
a flange integrally joined to the root portion and received in a mechanical retention slot,
wherein the rotary machine comprises a gas turbine engine.

* * * * *